United States Patent
Franzini (10) Patent No.: US 6,318,742 B2
(45) Date of Patent: *Nov. 20, 2001

(54) HYDRO-PNEUMATIC VEHICLE SUSPENSION SYSTEM

(75) Inventor: John D. Franzini, Brookfield, WI (US)

(73) Assignee: Actuant Corporation, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/782,112

(22) Filed: Feb. 13, 2001

Related U.S. Application Data (63) Continuation of application No. 09/122,041, filed on Jul. 24, 1998, now Pat. No. 6,220,613.
(60) Provisional application No. 60/053,847, filed on Jul. 25, 1997.

(51) Int. Cl.[7] .................................................. B60G 21/06
(52) U.S. Cl. ......................... 280/124.106; 280/124.159; 280/5.505; 280/5.506
(58) Field of Search .................... 280/5.505, 5.506, 280/5.507, 124.106, 124.104, 124.159, 124.158

(56) References Cited

U.S. PATENT DOCUMENTS

| | | |
|---|---|---|
| 2,926,023 | 2/1960 | Kraus ............................ 280/124.106 |
| 4,270,771 | 6/1981 | Fujii . |
| 4,606,551 | 8/1986 | Toti et al. ...................... 280/124.104 |
| 4,625,994 | 12/1986 | Tanaka et al. ................ 280/124.016 |
| 4,861,066 | 8/1989 | Dernie ................................ 280/5.505 |
| 4,930,807 | 6/1990 | Lachaize ........................... 280/5.505 |
| 5,447,332 | 9/1995 | Heyring . |
| 5,556,115 | 9/1996 | Heyring ............................. 280/6.158 |
| 5,562,305 | 10/1996 | Heyring . |
| 5,566,970 | 10/1996 | Lin ................................ 280/124.106 |
| 5,601,306 | 2/1997 | Heyring . |
| 5,601,307 | 2/1997 | Heyring et al. . |
| 5,794,966 | 8/1998 | Macleod ........................ 280/124.104 |
| 5,915,701 | 6/1999 | Heyring ............................. 280/5.505 |
| 6,010,139 | 1/2000 | Heyring et al. ............... 280/124.106 |

FOREIGN PATENT DOCUMENTS

| | | |
|---|---|---|
| 1535641 | 7/1968 | (FR) . |
| 01078912-A | * 3/1989 | (JP) . |
| WO-84/02887 | * 8/1984 | (WO) . |

* cited by examiner

*Primary Examiner*—Lanna Mai
*Assistant Examiner*—Ruth Lan
(74) *Attorney, Agent, or Firm*—Quarles & Brady LLP (57) ABSTRACT

An X-type hydro-pneumatic vehicle suspension system has diagonally opposite wheel support cylinders cross connected rod side to bore side to make a pair of discrete hydraulic circuits for each pair of diagonally opposite wheels of the vehicle. Each discrete circuit has two gas charged accumulators, one near the front and one near the rear. The gas chambers of accumulators in the two pairs of discrete hydraulic circuits are connected in a variety of ways to equalize pressures between the pairs of circuits.

2 Claims, 9 Drawing Sheets

HYDRO-PNEUMATIC VEHICLE SUSPENSION SYSTEM

CROSS-REFERENCE TO RELATED APPLICATIONS

This application is a continuation of U.S. application Ser. No. 09/122,041 filed Jul. 24,1998, now U.S. Pat. No. 6,220,613 B1, which claims the benefit of U.S. Provisional Patent Application No. 60/053,847 filed Jul. 25, 1997.

STATEMENT REGARDING FEDERALLY SPONSORED RESEARCH OR DEVELOPMENT

Not applicable.

BACKGROUND OF THE INVENTION

1. Field of the Invention

This invention relates to hydro-pneumatic vehicle suspension systems, and in particular to such systems having discrete hydraulic circuits, each of which is pressurized with a gas-charged accumulator.

2. Discussion of the Prior Art

Hydro-pneumatic vehicle suspension systems are well known. Typically, one or more single or double acting hydraulic cylinders are provided at each wheel to support the vehicle, with hydraulic circuits interconnecting the cylinders. A gas-charged accumulator is typically used to pressurize the hydraulic circuits and therefore, provide resilient displacement of the cylinders and consequently springing of the vehicle.

One hydro-pneumatic vehicle suspension system has come to be known as the "X"-type. In such a system, the cylinders of diagonally opposite wheels of a vehicle are connected with discrete hydraulic circuits, each circuit connecting the bore side of one of the cylinders with the rod side of the diagonally opposite cylinder. As used herein, "discrete" as referring to a hydraulic circuit means that the hydraulic circuit is closed against hydraulic fluid flow to or from another circuit, except for normal leakage, and includes a hydraulic circuit which is normally closed from external communication by 5 a valve, but can be opened by the valve to an external source or depository of hydraulic fluid. Such an X-system is known, for example, from patents such as French Patent No. 1,535,641 and U.S. Pat. Nos. 4,270,771; 5,447,332; 5,562,305; 5,601,306; and 5,601,307.

Thus, in an X-system, there are four discrete hydraulic circuits, with one pair of circuits associated with one set of diagonally opposite wheel support cylinders and the other pair associated with the other set of diagonally opposite wheel support cylinders.

Neglecting friction of the cylinders, the two circuits of each pair are at substantially the same pressure since that pressure is communicated from one discrete hydraulic circuit to the other through the pistons of the cylinders.

It is also known that it is desirable to equalize the pressures between the two pairs of discrete hydraulic circuits so that the wheel loading is kept substantially constant. In U.S. Pat. No. 4,270,771, pressure equalization between the two pairs of discrete hydraulic circuits is obtained by making the cylinders identical and by providing inlet/outlet check valves for each cylinder which supply all the cylinders with the same pressure or exhaust all the cylinders to the same tank pressure. In U.S. Pat. No. 5,447,332 and other patents listed above, pressure is equalized from one pair of circuits to the other by use of a "load distribution unit" (or "LDU") which has four chambers separated from fluid communication with one another by pistons, and each discrete hydraulic circuit is communicated with one of the chambers so as to substantially equalize the pressures among the four discrete hydraulic circuits.

SUMMARY OF THE INVENTION

It is an object of the invention to provide for pressure equalization among all four wheel support cylinders in a hydro-pneumatic suspension system without the need for spring-operated inlet or outlet valves or for an LDU. This is accomplished by communicating gas pressures of the two pairs of circuits with one another.

A system of the invention has the benefit that it does not add substantially to the weight of an X-type system. In addition, the invention materially reduces the number of hydraulic fluid leak paths of an X-type with LDU system, since the LDU is eliminated. Reducing the weight of the suspension system has cost savings, requires less power to start and stop the vehicle and makes the vehicle more agile, for example, in cornering.

Eliminating the LDU also has the benefit of reducing the inertia of the suspension system. Since the LDU has pistons and a substantial volume of hydraulic fluid, all of which moves back and forth in normal operation, eliminating the moving pistons and hydraulic fluid reduces the inertia of the system, thereby making it more responsive to the forces exerted on the wheels of the vehicle in operation.

The foregoing and other objects and advantages of the invention will be apparent from the drawings and the detailed description.

DETAILED DESCRIPTION OF THE PREFERRED EMBODIMENTS

Figure 1:
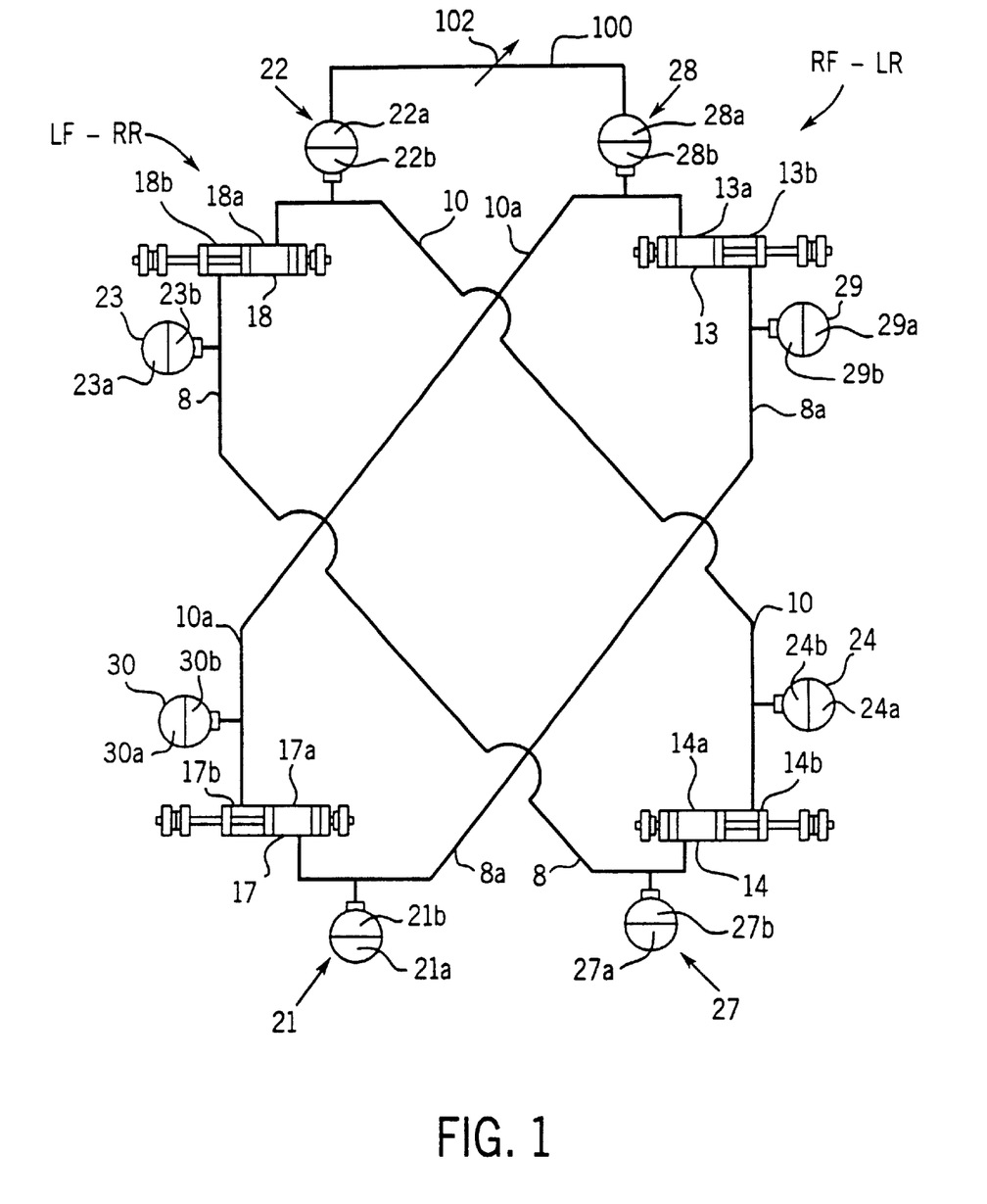
FIG. 1 is a schematic view of an X-type hydro-pneumatic vehicle suspension system incorporating the invention.

FIG. 1 illustrates an X-type hydro-pneumatic vehicle suspension system of the type described in French Patent No. 1,535,641 and U.S. Pat. Nos. 4,270,771 and 5,447,332, which are hereby incorporated by reference, but which has been modified to incorporate the present invention. The components illustrated in FIG. 1 which are in common with FIG. 2 of U.S. Pat. No. 5,447,332 patent have been given the same reference numbers, but FIG. 1 hereof has been modified to remove the LDU and add gas pressure communication via conduit line 100 between the gas pressure chambers 22a and 28a of the accumulators 22 and 28. A variable restriction 102 may also be added in the line 100 between the gas pressure chambers 22a and 28a.

In FIG. 1, the reference numbers other than those stated in the above paragraph are the same as in U.S. Patent No. 5,447,332, FIGS. 1 and 2. Briefly, the left front wheel cylinder 18 has its bore side chamber 18a connected by hydraulic line 10 to the bore side chamber 14b of the right rear support cylinder 14. Bore side chamber 14a of cylinder 14 is connected by hydraulic line 8 to rod side chamber 18b of the left front cylinder 18. Accumulators 22 and 24 have their hydraulic chambers 22b and 24b in communication with line 10, and accumulators 23 and 27 have their hydraulic chambers 23b and 27b in communication with line 8. Thus, one discrete hydraulic circuit is made up by bore side chamber 18a, line 10, hydraulic chambers 22b and 24b, and rod side chamber 14b. The other discrete hydraulic circuit of the pair of circuits associated with the left font and right rear wheels is the hydraulic circuit including bore side chamber 14a, line 8, hydraulic chambers 27b and 23b, and rod side chamber 18b.

There are also two discrete hydraulic circuits associated with the right front wheel support cylinder 13 and the left rear wheel support cylinder 17. One of these circuits includes bore side chamber 13a, line 10a, hydraulic chambers 28b and 30b of the respective accumulators 28 and 30, and rod side chamber 17b of the left rear cylinder 17. The other of this pair of hydraulic circuits includes bore side chamber 17a, line 8a, hydraulic chambers 21b and 29b of the respective accumulators 21 and 29, and rod side chamber 13b of the right front wheel support cylinder 13.

Thus, there are two pairs of discrete hydraulic circuits, totaling four discrete hydraulic circuits. The pair associated with the left front cylinder 18 and the right rear cylinder 14, is denominated LF-RR, short for left front-right rear. The pair associated with the right front cylinder 13 and the left rear cylinder 17 is denominated RF-LR, short for right front-left rear.

The invention provides for pressure equalization between the LF-RR pair of circuits and the RF-LR pair of circuits. In its simplest form, this is provided by communicating the gas chambers 22a and 28a of the accumulators 22 and 28 via line 100 as described above, so as to make a single volume of gas contained by the chambers 22a, 28a and line 100. Once this communication is provided, the LF-RR pair of circuits and RF-LR pair of circuits will communicate pressures between them dynamically, via the volume of gas in the connected gas chambers 22a and 28a and the line 100. Variable restriction 102 may be opened or closed to adjust the degree of this communication.

Figure 2:
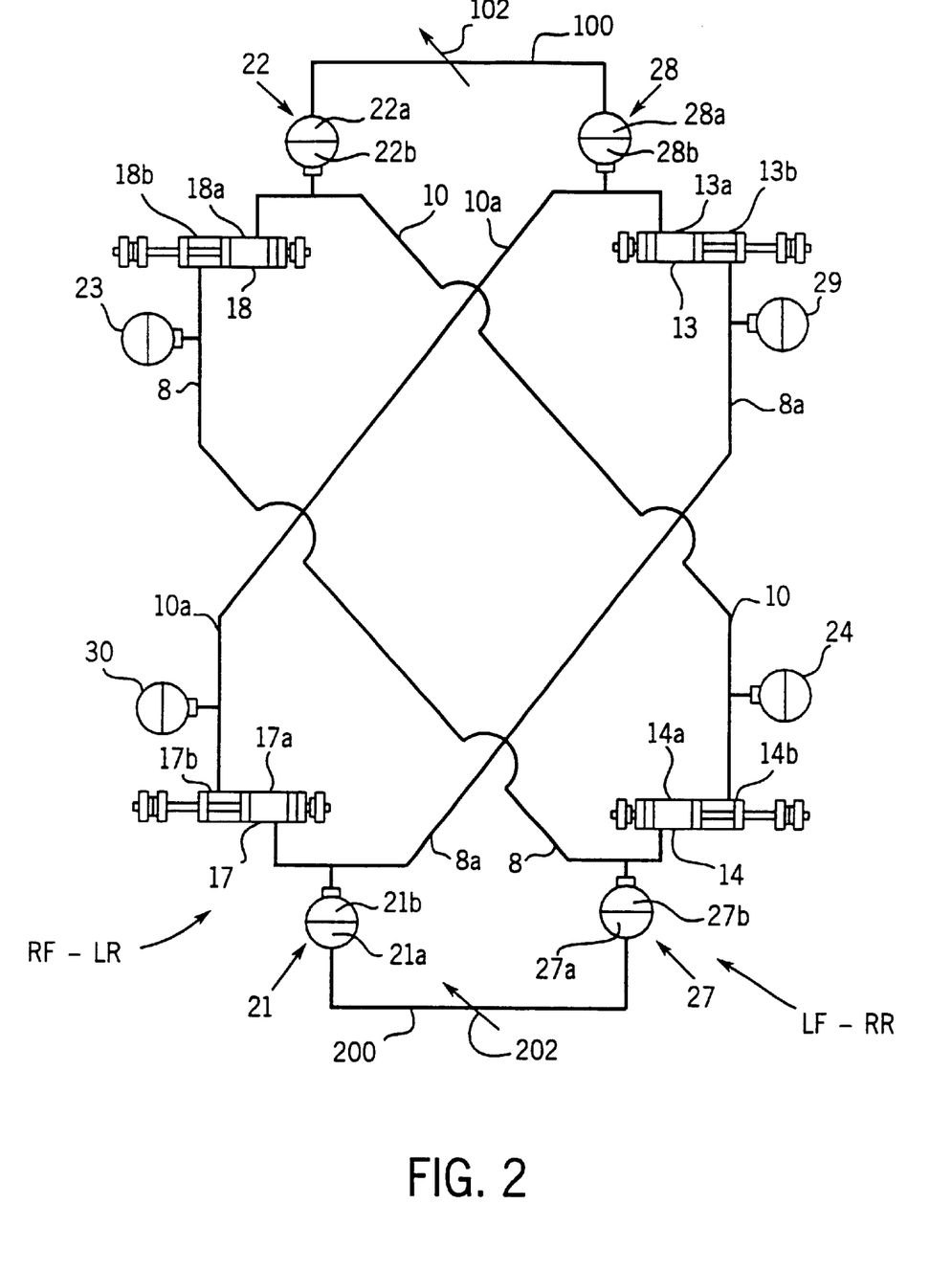
FIG. 2 is a view like FIG. 1 of a second embodiment of the invention.

Variations on communicating the gas pressures between the LF-RR and RF-LR pairs are provided in FIGS. 2–5. FIG. 2 is like FIG. 1, which communicates the gas chambers 22a and 28a of the two front bore side accumulators 22 and 28 with line 100, but also communicates the gas chambers 21a and 27a of the two rear bore side accumulators 21 and 27 with each other via line 200, to make a second volume of gas, which is contained by chambers 21a and 27a and line 200, which is common to the two pairs LF-RR and RF-LR. A variable restriction 202 may also be provided in the line 200. It may be desirable to add the line 200 to the line 100 so as to decrease the response time of equalizing the pressures between the two pairs of circuits.

Figure 3:
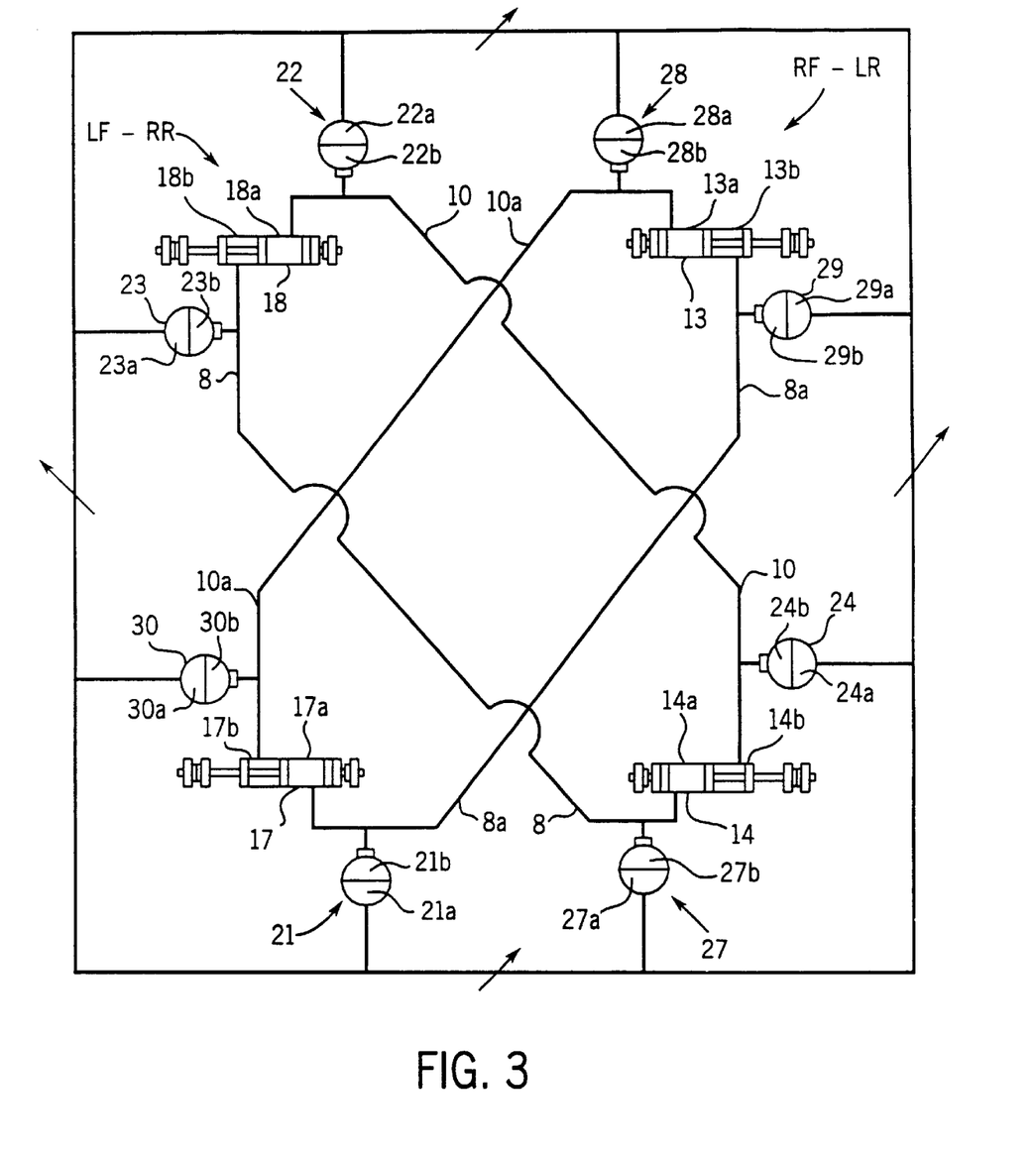
FIG. 3 is a view like FIG. 1 of a third embodiment of the invention.

FIG. 3 illustrates a system in which all of the gas chambers of all of the accumulators are interconnected with one another, so that a single volume of gas, contained by all of the gas chambers and the interconnecting lines, is common to both pairs of circuits LF-RR and RF-LR. Each gas chamber is identified with the reference number of the corresponding accumulator and an "a". Each hydraulic chamber of the respective accumulator is identified with the reference number of the accumulator and a "b". This system would provide for even faster response times of equalizing the pressures throughout all portions of the suspension system.

Figure 4:
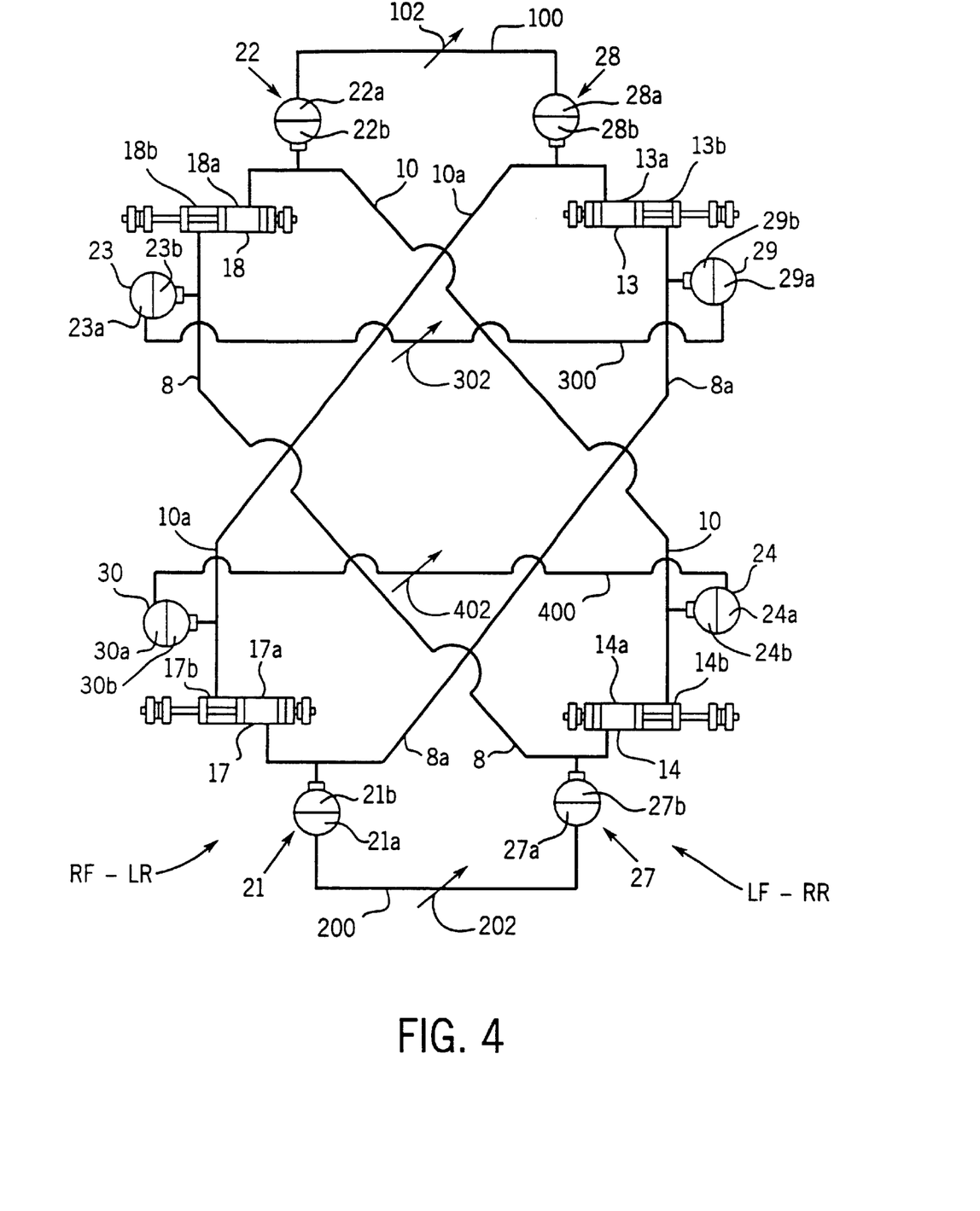
FIG. 4 is a view like FIG. 1 of a fourth embodiment of the invention

FIG. 4 is another variation similar to FIG. 2, but in which four separate volumes of gas are each common to the two pairs of circuits RF-LR and LF-RR. In FIG. 4, the front rod side accumulators 23 and 29 have their gas chambers connected with one another by line 300 and the rod side accumulators 24 and 30 of the rear cylinders have their gas chambers connected by line 400. Respective variable restrictions 302 and 402 may also be added.

Figure 5:
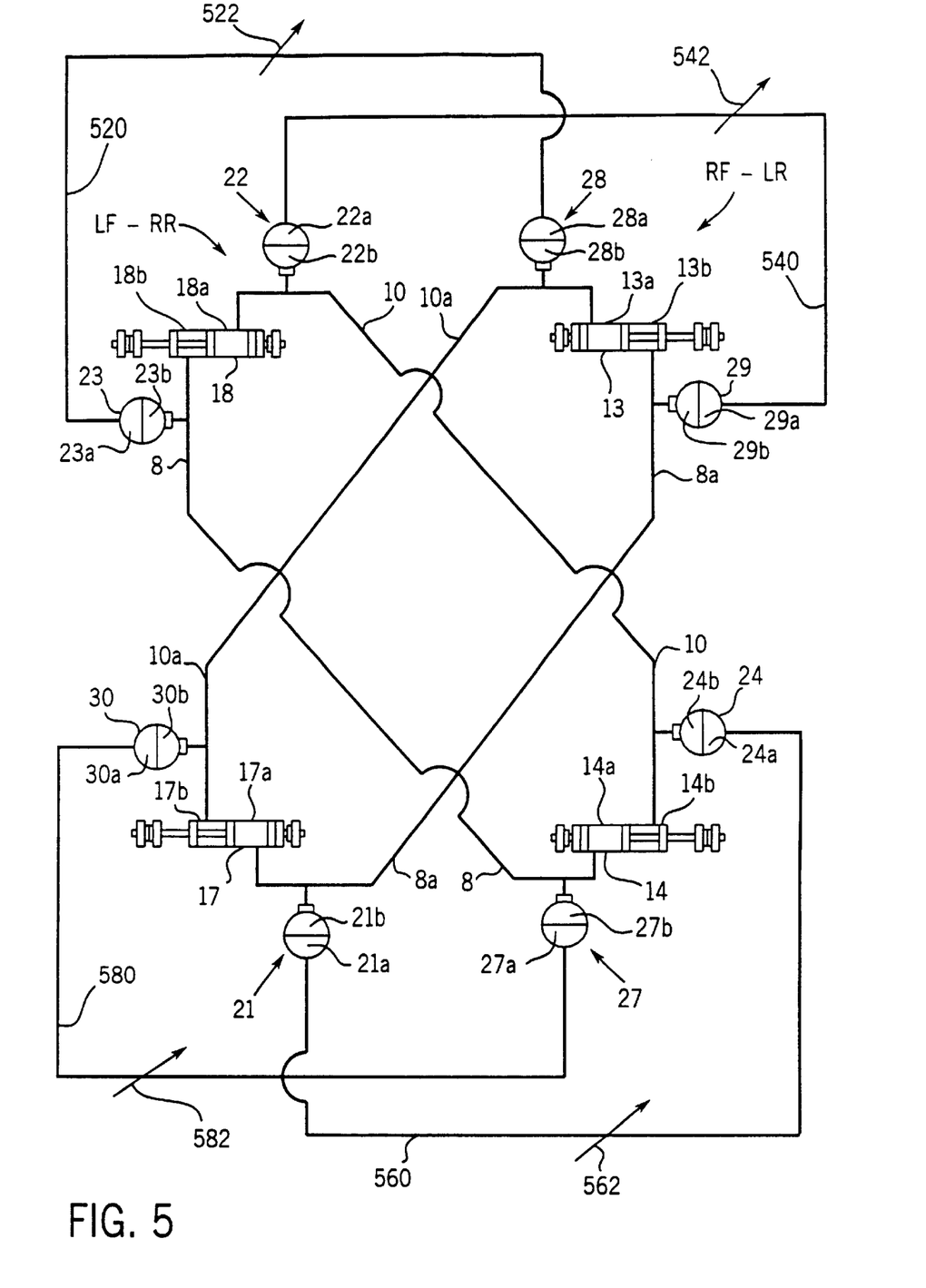
FIG. 5 is a view like FIG. 1 of a fifth embodiment of the invention.

FIG. 5 is another case in which four separate gas volumes act on both pairs and illustrates a variation which is particularly adapted for roll-control to counteract suspension forces exerted when a vehicle corners. In FIG. 5, the front bore side accumulators 22 and 28 each have their respective gas chamber 22a and 28a connected to the respective gas chamber 29a, 23a of the front rod side accumulators 29, 23, on the opposite side of the vehicle. Similarly, in the rear of the vehicle, the rod side accumulator gas chamber 24a, 30a is in communication with the respective bore side accumulator gas chamber 21a, 27a.

Thus, for example when the vehicle turns left, the pressure in the right front bore side accumulator 28 is at first increased, and that increased pressure is communicated to bore side accumulator 23 via line 520 and variable restriction 522 so as to initially lower the vehicle body relative to the left front wheel, thereby counteracting the roll force. At the same time, the roll force decreases the pressure in the right front rod side accumulator 29, which is communicated by line 540 and variable restriction 542 to left front bore side accumulator 22 to also help lower the left front of the vehicle and counteract the roll force.

Similarly, in the rear, during a left turn of the vehicle, the left rear tends to move up relative to the wheel, which reduces the left rear bore side pressure and increases the left rear rod side pressure, as weight is taken off the left rear wheel due to the inertia of the vehicle. Line 560 and variable restriction 562 communicate the reduced gas pressure of the left rear bore side accumulator 21 to the right rear rod side accumulator gas chamber 24a, which tends to raise the right rear of the vehicle relative to the right wheel, so as to put more weight on the left wheel and counteract the roll force. The increased pressure in the left rear rod side accumulator gas chamber 30a is connected by line 580 and variable restriction 582 to the right rear bore side accumulator gas chamber 27a to also help raise the right rear of the vehicle to counteract the roll force.

Figure 6:
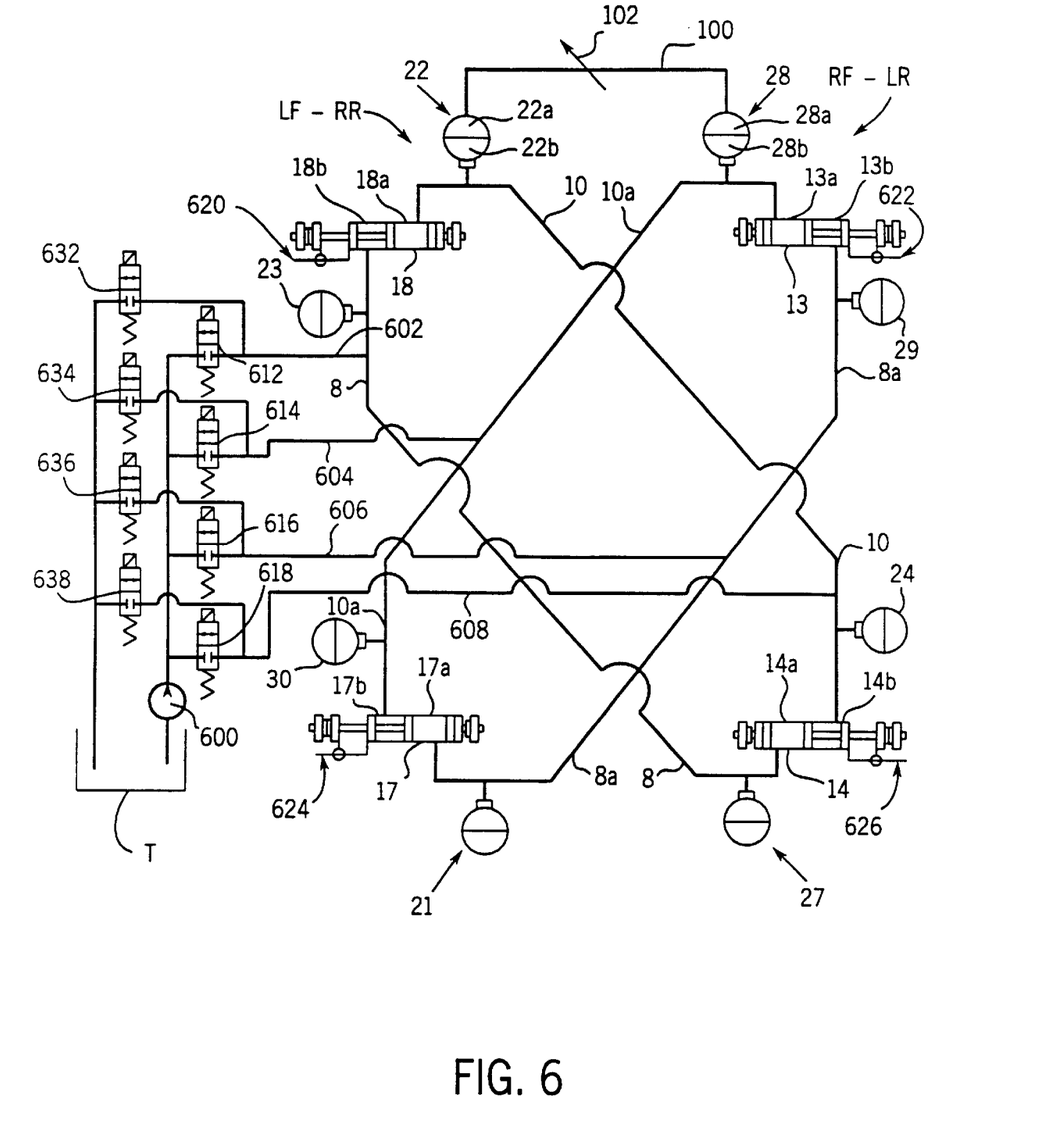
FIG. 6 is a view like FIG. 1 of a sixth embodiment of the invention.

FIG. 6 illustrates a variation which can be applied to any of the circuits of FIGS. 1–5, but for simplicity is applied to the circuit of FIG. 1 in FIG. 6. In this embodiment, an external hydraulic pump 600, for example the vehicle power steering pump, is used as a source of fluid supply for the suspension system, with separate lines 602, 604, 606, and 608 connected to the respective lines 8, 10a, 8a, and 10. Two-way, two-position solenoid-operated valves 612, 614, 616, and 618 are selectively operated to place the respective lines 8, 10a, 8a, and 10 into communication with the pump 600. Providing an external source of fluid under pressure is desirable for making up for fluid losses, as can occur as a result of leakage, and also to provide for load leveling, which is desirable when the vehicle is loaded unevenly so as to shift the center of gravity of the vehicle toward one side, one end or one corner of the vehicle.

Figure 11:
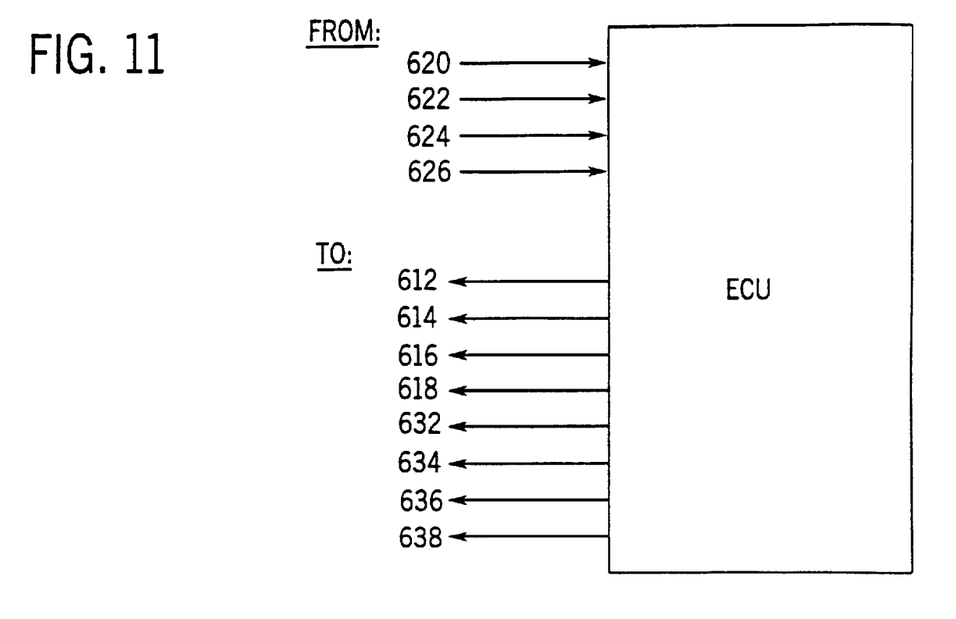
FIG. 11 is a schematic view of inputs and outputs to an electronic control unit for controlling the circuit of FIG. 6.

For load leveling, a level sensor 620, 622, 624, and 626, which may be any suitable type of linear displacement transducer, is preferably provided at each respective cylinder 18, 13, 17, and 14. These provide an indication of the position of each wheel relative to the chassis of the vehicle. The electrical signals from each of the sensors or transducers 620, 622, 624, and 626 is input to an electronic control unit ECU (FIG. 11), which compare the inputs signals to each other and to reference values and outputs appropriate signals to the valves 612, 614, 616, and 618 so as to add fluid to any of the lines 8, 10a, 8a, or 10 in need of fluid. Of course, if fluid is added to any of these lines, some fluid may have to be exhausted from other lines, so for that purpose, tank pressure valves 632, 634, 636, and 638 arc also in communication with each of the respective lines 8, 10a, 8a, and 10 to selectively provide communication with tank pressure, indicated by T, in response to appropriate signals from the electronic control unit described above. Adding a certain amount of hydraulic fluid to any discrete hydraulic circuit to extend a cylinder which has its bore side in communication with the circuit will extend the cylinder less than the amount of retraction obtained by adding the same amount of fluid to retract a cylinder with its rod side in communication with the circuit, since the area of the cylinder piston on the bore side is greater than the area on the rod side, by an amount approximately equal to the area of the rod.

Figure 7:
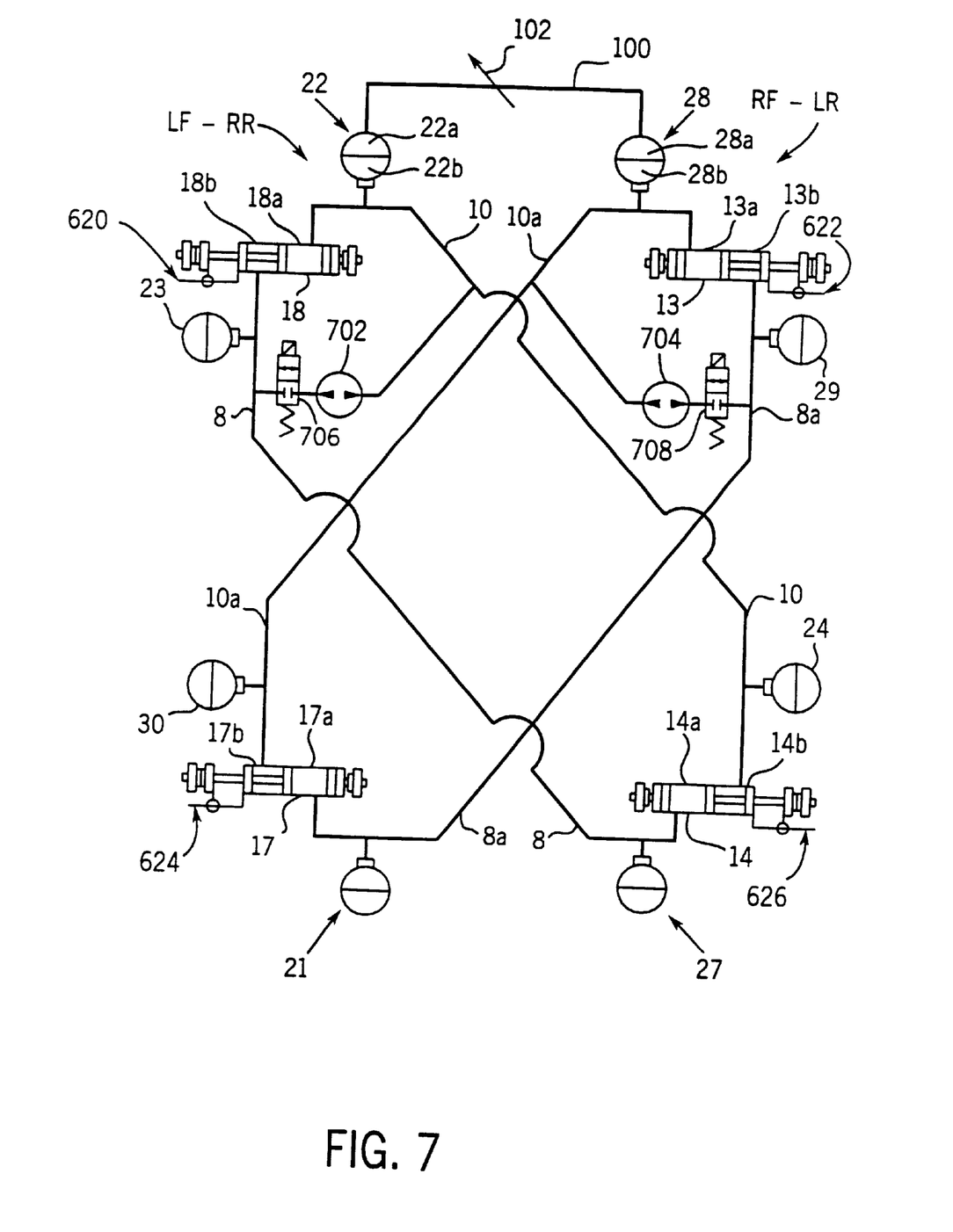
FIG. 7 is a view like FIG. 1 of a seventh embodiment of the invention.

In the case of a zero leakage loss system, the circuit of FIG. 7 can be used to the circuit variations of FIGS. 1–5.

FIG. 7 illustrates a modification to the circuit of FIG. 1, but may be applied to any of the circuits of FIGS. 1–5. FIG. 7 is like FIG. 1 in that it only has the connecting line 100 and variable restriction 102, but differs from FIG. 1 in that two bidirectional pumps 702 and 704 are provided and a solenoid-operated, two-way, two-position valve 706 or 708 is associated with each respective pump 702, 704. The pump 702 and valve 706 connect the two discrete hydraulic circuits of the circuit pair LF-RR and the pump 704 and valve 708 connect the two discrete hydraulic circuits of the circuit pair RF-LR. When valve 706 is off, lines 8 and 10 are isolated from one another. When valve 706 is on, and pump 702 is driven clockwise (CW) and fluid is pumped from line 8 to line 10. When the pump 702 is driven counterclockwise (CCW), fluid is pumped from line 10 to line 8.

Similarly, when valve 708 is off, lines 8a and 10a are isolated from one another. When valve 708 is on and pump 704 is operated in the clockwise direction, fluid is pumped from line 10a to 8a. When pump 704 is operated counterclockwise, fluid is pumped from line 8a to 10a.

Thus, the valves 706 and 708 and pumps 702 and 704 can be operated to change the height of the corners, sides, or ends of the vehicle as follows:

| | Valve 706 | Pump 702 | Valve 708 | Pump 704 |
|---|---|---|---|---|
| Front left corner up, rear right corner down | on | CW | off | off |
| Front left corner down, rear right corner up | on | CCW | off | off |
| Front right corner up, rear left corner down | off | off | on | CCW |
| Front right corner down, rear left corner up | off | off | on | CW |
| Left side up, right side down | on | CW | on | CW |
| Right side up, left side down | on | CCW | on | CCW |
| Front end up, rear end down | on | CW | on | CCW |
| Front end down, rear end up | on | CCW | on | CW |

Figure 12:
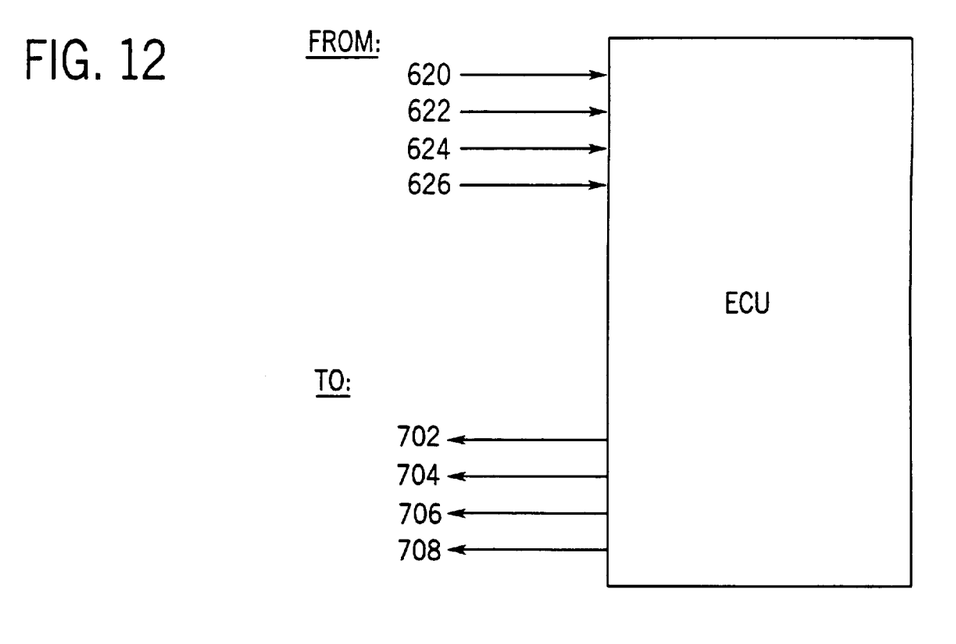
FIG. 12 is a schematic view of inputs and outputs to an electronic control unit for controlling the circuit of FIG. 7.

The circuit of FIG. 7 is controlled by an ECU as illustrated in FIG. 12, with inputs to the ECU from the transducers 620, 622, 624 and 626, and outputs to the valves 706, 708 and pumps 702, 704. Inputs to either of the ECUs shown in FIGS. 11 and 12 could also include pressure signals from pressure transducers (not shown) applied to any or all of the gas chambers of the accumulators or to various points in the hydraulic fluid circuits. These pressure signals could be used to signal a problem condition, or to add or subtract fluid from the various circuits. A compressor and supply of the gas used in the accumulators, typically nitrogen, could also be provided, and the pressure or linear transducer signals used by the ECU could be used to control gas valves to add or subtract gas from the gas pressure circuits.

Figure 8:
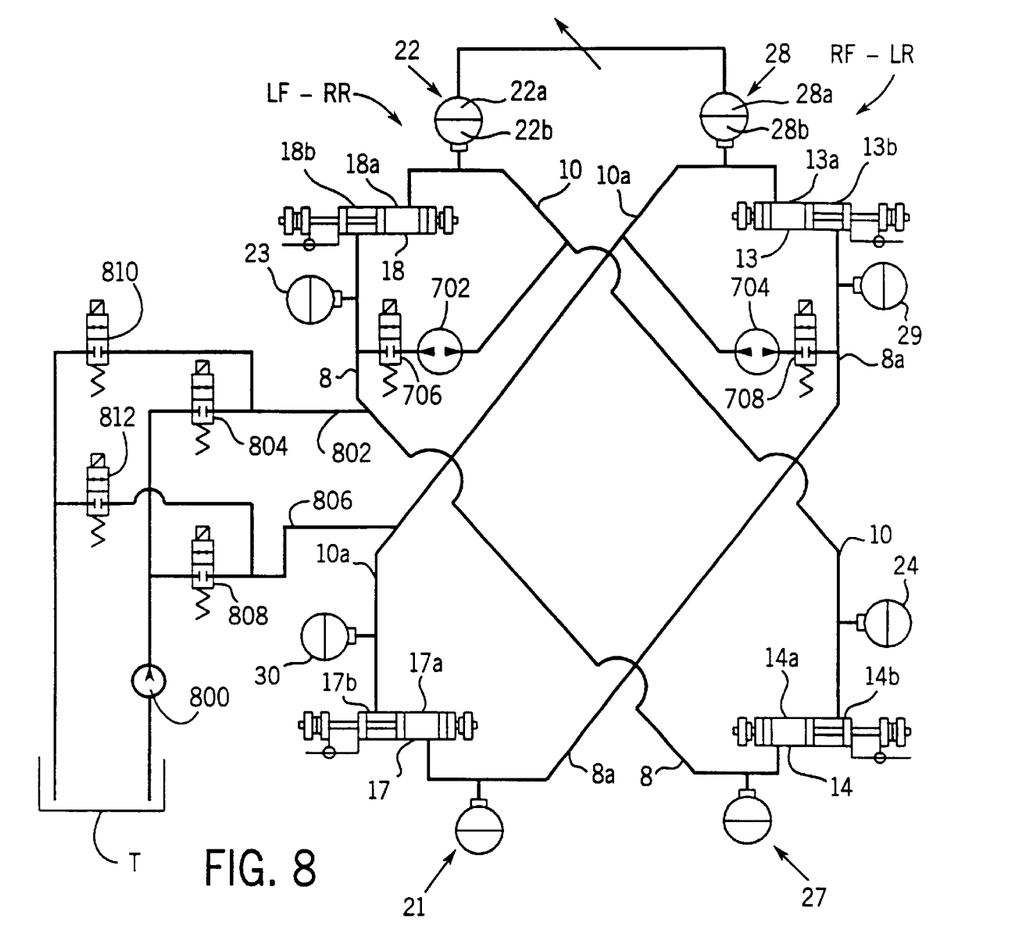
FIG. 8 is a view like FIG. 7 of an eighth embodiment of the invention.

FIG. 8 illustrates a variation on the circuits of FIGS. 1 and 7, which can be applied to any of the circuits of FIGS. 1–5 and 7. FIG. 8 illustrates this variation as applied to the circuits of FIGS. 1 and 7 for simplicity.

FIG. 8 combines the circuit of FIG. 7 with an external source of fluid under pressure, pump 800. Since fluid can be pumped between the discrete hydraulic circuit of each pair of circuits to the other circuit of the pair by the pumps 702 or 704, the pump 800 need only be communicable with one of the circuits of each pair. Accordingly, line 802 and valve 804 place line 8 of the LF-RR circuit in communication with pump 800 when the valve 804 is turned on, and line 806 and valve 808 place line 10a in communication with the pump 800 when the valve 808 is turned on. Since it may be necessary to remove fluid from one or both of the circuits LF-RR or RF-LR, valves 810 and 812, respectively, are provided which can be selectively operated to place the respective lines 8 and 10a into communication with the tank T.

Figure 9:
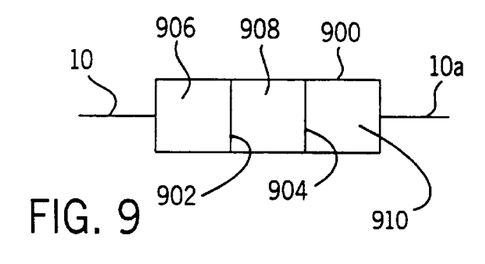
FIG. 9 is a view of an alternate accumulator which could be used in place of two or more of the accumulators of the systems of FIGS. 1–8.

FIG. 9 illustrates an accumulator which may be used in place of two or more of the accumulators of the circuits previously described, for example in place of the accumulators 22 and 28. FIG. 9 is a schematic depiction with box 900 representing a cylinder and lines 902 and 904 representing floating pistons inside the cylinder 900 which have a sliding seal between their outer perimeter and the interior of the cylinder 900. The pistons 902 and 904 divide the cylinder 900 into three interior chambers 906, 908, and 910. The outer chambers 906 and 910 are hydraulic chambers, and the central chamber 908 is a gas charged chamber, typically charged with nitrogen just like the accumulators 22 and 28 are typically charged with nitrogen. Chamber 906 is filled with hydraulic fluid and is in communication with line 10, and chamber 910 is filled with hydraulic fluid and is in communication with line 10a. Thus, the pressures in lines 10 and 10a indirectly communicate with one another via the pistons 902 and 904 and the gas chamber 908.

Figure 10:
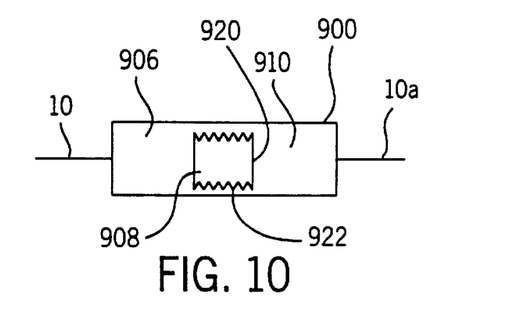
FIG. 10 is a view like FIG. 9 of an alternate embodiment of an accumulator.

FIG. 10 illustrates a variation of the accumulator illustrated in FIG. 9 in which cylinder 900 is divided into two chambers 906 and 910 by a slidable piston 920 and the third gas charged chamber 908 is provided inside an expandable and contractible bellows 922, which is totally closed so as to minimize absorption of the gas in the chamber 908 by the fluid in the cylinder 900. This also eliminates the leak paths past the pistons 902 and 904 in the embodiment of FIG. 9. As illustrated, one end of the bellows 922 may be closed by the piston 920, for example, by welding the walls of the bellows 922 to the piston 920. The diameter of the cylinder 900 is preferably kept as small as possible, to reduce the mass of hydraulic fluid and pistons contained within it, to as to minimize their inertia.

Thus, the invention provides for indirect pressure equalization between discrete hydraulic circuits of a hydro-pneumatic vehicle suspension system by providing pressure communication between gas chambers or circuits which pressurize the hydraulic circuits.

This is particularly beneficial when applied to an X-type suspension system having two pairs of discrete hydraulic circuits, with the circuits of each pair at substantially the same pressure, but each pair not necessarily equal in pressure to the other pair at any given point in time. The invention provides for indirect pressure communication between the pairs in a simple manner, avoiding the relatively expensive prior art system of a hydraulic pump and check valves, or a load distribution unit.

Many modifications and variations to the preferred embodiments described will be apparent to those skilled in the art. For example, while the invention is illustrated as applied to double acting wheel support cylinders, it could be applied to an X-type system of the type having a pair of single acting cylinders at each wheel. Therefore, the invention should not be limited to the preferred embodiments described, but should be defined by the claims which follow.

I claim:

1. In an X-type hydro-pneumatic vehicle suspension system having wheel support cylinders of diagonally opposite wheels of a vehicle connected with a pair of discrete hydraulic circuits, each said circuit containing hydraulic fluid and connecting the bore side of one of the diagonally opposite cylinders with the rod side of a diagonally opposite cylinder, such that the vehicle has two said pairs of said discrete hydraulic circuits, one said pair for each set of diagonally opposite wheels, and wherein at least one gas charged accumulator exerts pressure in each of said hydraulic circuits, the improvement wherein the gas chambers of the gas charged accumulators are connected by a gas line so as to create a single volume of gas which exerts pressure simultaneously on the hydraulic fluid in both pairs of discrete hydraulic circuits so as to communicate instantaneous dynamic pressure changes in one of said pairs to the other of said pairs through said gas line and thereby substantially equalize instantaneous pressures dynamically in the pairs of discrete hydraulic circuits wherein said volume of gas exerts pressure on discrete hydraulic circuits which are in communication with bore sides of two wheel support cylinders at one end of said vehicle and a second volume of gas exerts pressure in discrete hydraulic circuits which are in communication with rod sides of two wheel support cylinders at said one end of said vehicle.

2. In an X-type hydro-pneumatic vehicle suspension system having wheel support cylinders of diagonally opposite wheels of a vehicle connected with a pair of discrete hydraulic circuits, each said circuit containing hydraulic fluid and connecting the bore side of one of the diagonally opposite cylinders with the rod side of a diagonally opposite cylinder, such that the vehicle has two said pairs of said discrete hydraulic circuits, one said pair for each set of diagonally opposite wheels, and wherein at least one gas charged accumulator exerts pressure in each of said hydraulic circuits, the improvement wherein the gas chambers of the gas charged accumulators are connected by a gas line so as to create a single volume of gas which exerts pressure simultaneously on the hydraulic fluid in both pairs of discrete hydraulic circuits so as to communicate instantaneous dynamic pressure changes in one of said pairs to the other of said pairs through said gas line and thereby substantially equalize instantaneous pressures dynamically in the pairs of discrete hydraulic circuits wherein said volume of gas exerts pressure on discrete hydraulic circuits which are in communication with bore sides of two wheel support cylinders at one end of said vehicle and a second volume of gas exerts pressure in discrete hydraulic circuits which are in communication with rod sides of two wheel support cylinders at said one end of said vehicle, a third volume of gas exerts pressure in discrete hydraulic circuits which are in communication with bore sides of two wheel support cylinders at an opposite end of said vehicle, and a fourth volume of gas exerts pressure in discrete hydraulic circuits which are in communication with rod sides of two wheel support cylinders at said opposite end of said vehicle.

\* \* \* \* \*